United States Patent [19]
Smith et al.

[11] 4,384,813
[45] May 24, 1983

[54] SHINGLE STACKER WITH SHINGLE INVERTING FEATURE

[75] Inventors: Douglas D. Smith, Conifer; Richard N. Cunningham, Littleton, both of Colo.

[73] Assignee: Manville Service Corporation, Denver, Colo.

[21] Appl. No.: 238,788

[22] Filed: Feb. 27, 1981

[51] Int. Cl.³ .......................................... B65G 57/081
[52] U.S. Cl. ..................................... 414/31; 198/374; 198/406; 271/65; 271/186; 271/192; 414/49; 414/55; 414/81
[58] Field of Search .................. 414/30, 31, 49, 55, 414/81; 198/374, 399, 400, 406; 271/65, 186, 192; 53/544

[56] References Cited

U.S. PATENT DOCUMENTS

| | | | |
|---|---|---|---|
| 3,082,885 | 3/1963 | Williamson | 414/31 |
| 3,128,889 | 4/1964 | Johnson et al. | 414/55 X |
| 3,186,565 | 6/1965 | Williamson | 414/31 |
| 3,205,794 | 9/1965 | Califano et al. | 414/81 X |
| 3,332,561 | 7/1967 | Hedborg | 414/31 |
| 4,124,128 | 11/1978 | Adams et al. | 414/31 |

FOREIGN PATENT DOCUMENTS 964583 5/1957 Fed. Rep. of Germany ........ 414/31

*Primary Examiner*—Leslie J. Paperner
*Attorney, Agent, or Firm*—Gregory W. O'Connor

[57] ABSTRACT

The present invention concerns stacking of shingles, in particular shingles having one edge portion thicker than the other edge portion. Such shingles require that at least some of the shingles in a stack be oriented to place the thicker edge thereof opposite the thicker edge of the other shingles in the stack to form a neat and easily packaged stack of shingles. Such a stack of shingles must be formed quickly and accurately in order to keep up with the high rate of shingle production. The present invention accomplishes this by permitting selected shingles to be dropped and simultaneously rotated about a longitudinal axis as the shingles drop from one star wheel catcher (20) to another star wheel catcher (30). This rotation takes place by applying a substantial moment to the shingle as it falls by interposing specially shaped flipping fingers (46) in the path of the shingle. These fingers engage the falling shingle initially at an edge remote from the longitudinal axis of the shingle and progressively closer to the longitudinal axis as the shingle begins to rotate in order to provide a rotational moment of adequate magnitude and duration to accomplish the complete inversion of the shingle by the time it reaches a stack forming location.

5 Claims, 4 Drawing Figures

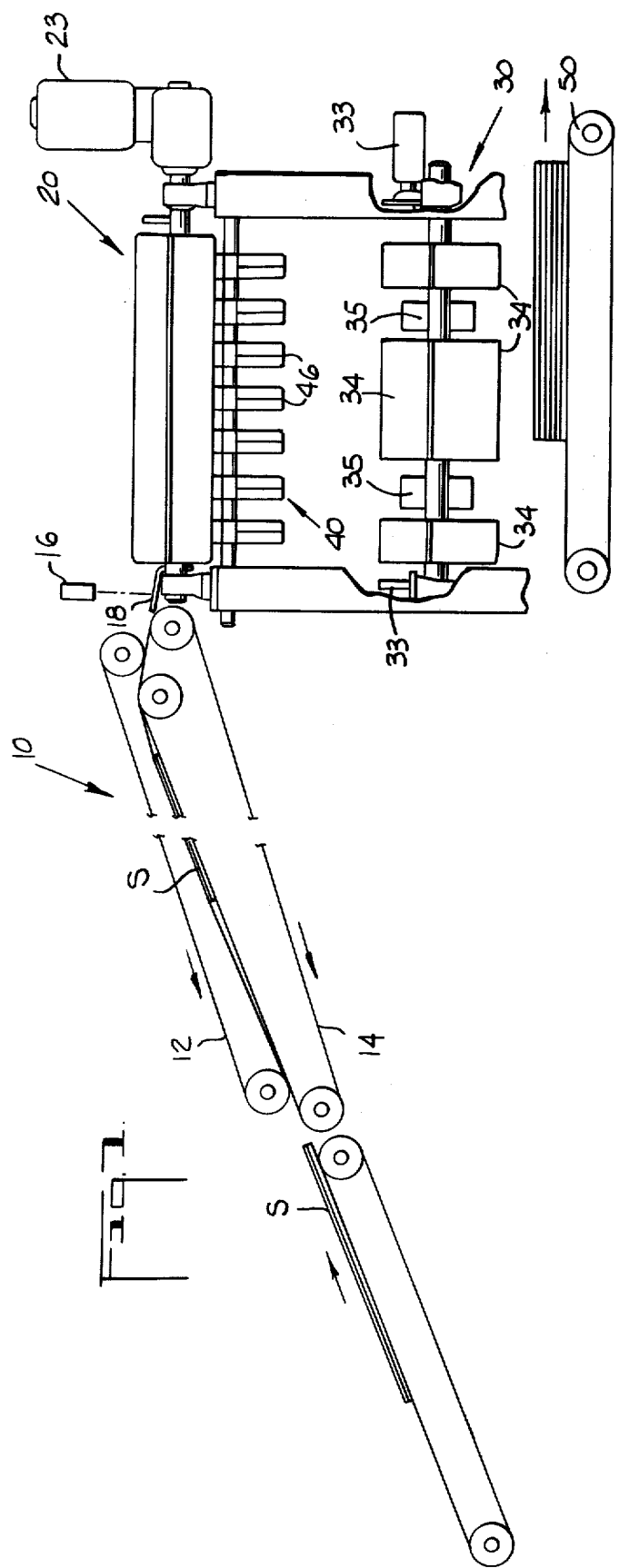

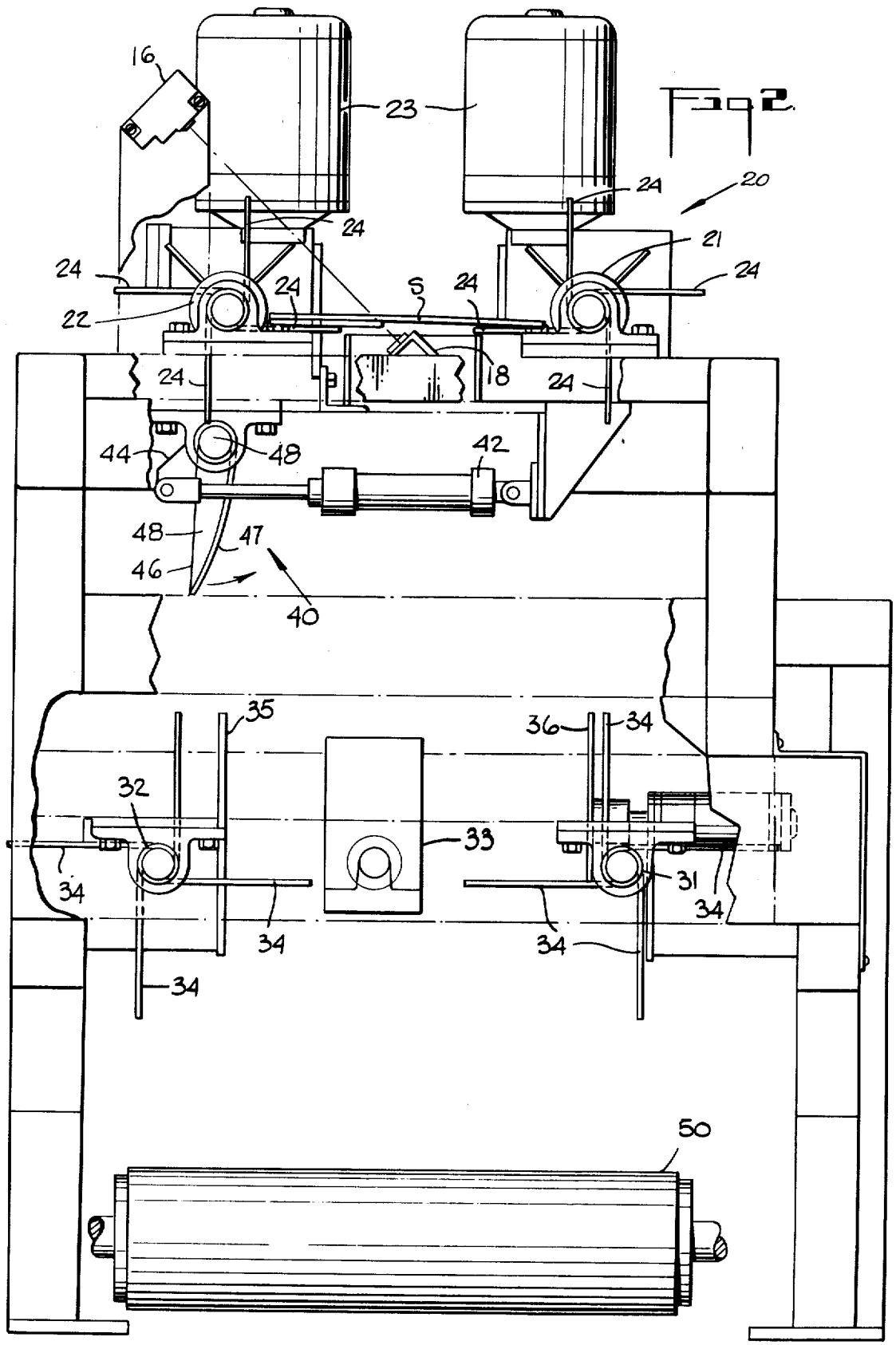

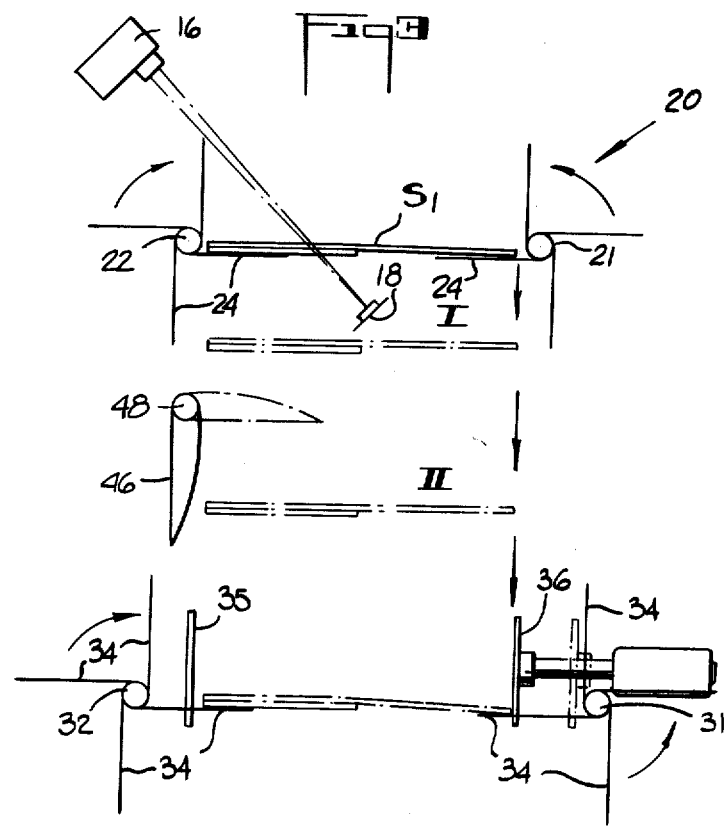
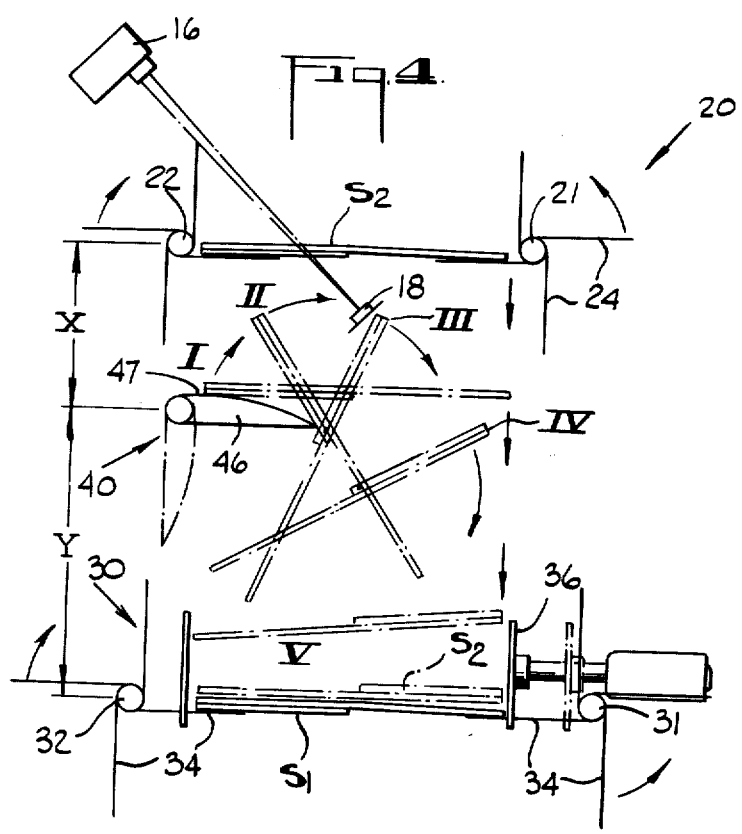

SHINGLE STACKER WITH SHINGLE INVERTING FEATURE

TECHNICAL FIELD

The present invention relates to apparatus for forming stacks of shingles for subsequent packaging of these stacks of shingles immediately after the manufacture of the shingles. More particularly, the present invention relates to the stacking for subsequent packaging shingles having at least one longitudinal edge or edge portion which is substantially thicker than the other longitudinal edge or edge portion, i.e., the so-called thick-butt shingles. Such shingles are referred to as laminated shingles since the thick-butt portion is made by laminating two thicknesses of a composite material, usually an asphalt coated or impregnated flexible mat material.

BACKGROUND OF THE PRIOR ART

Systems have been proposed for forming stacks of thick-butt shingles in which every other shingle in the stack has its thick portion alternating with the thin portion of the next adjacent shingle. In particular, one system receives pairs of shingles formed by a shingle laminating apparatus. These shingle pairs are made by diverting every other shingle as they are produced by the shingle laminating apparatus, accelerating this shingle using a belt-type conveyor, and sliding the accelerated shingle on a U-shaped chute, thus inverting this shingle end for end. The thus accelerated and inverted shingle arrives at a collator about the same time a non-inverted shingle arrives to form a shingle pair. This shingle pair is combined with other shingle pairs to form a stack of shingles which, as is the practice, is subsequently wrapped in bundle form for easy shipping and ultimate installation on a roof. However, the accelerated (and inverted) shingle was subject to damage on being received in the shingle pair collator. Also, the U-shaped chute encountered a great deal of wear since such laminated shingles are coated with a mineral aggregate weather surface which is by nature very abrasive in character.

Thus there remained in the prior art the need for an apparatus which could receive thick-butt, laminated shingles at a high sequential rate and yet successfully invert such shingles with little or no damage, and subsequently form bundles of inverted and noninverted shingles for subsequent packaging.

BRIEF DESCRIPTION OF THE INVENTION

Accordingly, Applicants have provided an apparatus for forming stacks of shingles. This apparatus comprises a first means for conveying a shingle from a first position to a second position, a second means at said second position for receiving said shingle from the first means and for dropping said shingle to a third position, a third means at a third position for receiving said shingle dropped from said second means and for forming a stack of shingles comprising a plurality of shingles dropped from said second means, and a fourth means vertically between the second means and the third means for selectively applying to said shingle, as said shingle falls from said second means, a moment about a longitudinal axis, this moment being of a magnitude and duration adequate to rotate the shingle about said axis and invert said selected shingle as it falls to said third position, a stack would be formed at the third means of at least one shingle which has dropped without being inverted from said second position to the third position and at least one shingle which has been dropped from said second means and inverted by said fourth means.

In the preferred embodiment the first means is an ordinary belt conveyor which carries the shingles, one at a time, from the production facility to the second means. This second means is a star wheel catcher which can operated to receive and to drop the shingle to the third means. The third means is a stacking bin which comprises a different form of star wheel catcher as well as edge aligning means to neatly stack the shingles dropped into it by the second means. The fourth means preferably comprises a flipper arm which initially engages the shingle to be inverted adjacent one edge thereof and which is further configured so that as the shingle begins to rotate, the flipper arm progressively engages the shingle at locations closer and closer to the longitudinal axis about which the shingle is rotating. This is accomplished by providing a plurality of fingers which are selectively positioned in the path of the falling shingle. These plurality of fingers include an upper surface having a shape defined by a circular cylinder.

BRIEF DESCRIPTION OF THE DRAWINGS

FIG. 1 shows an overall side view of the apparatus in accordance with the preferred embodiment.

FIG. 2 shows an end view of the portion of the apparatus.

FIG. 3 shows an operation of the apparatus.

FIG. 4 shows a similar view of the apparatus in the process of inverting a selected shingle.

DETAILED DESCRIPTION OF THE INVENTION

Referring to FIG. 1, apparatus 1 includes a first means 10 preferably comprising an accelerating conveyor of a known construction. Shingles S having one longitudinal edge thicker than the other longitudinal edge. (In this case the thicker or butt edge comprising two thicknesses of composition shingle material laminated together) are received from shingle laminating facility (not shown) between upper and lower belts 12 and 14 at a first position shown at the left end thereof in FIG. 1. Conveyor 10 accelerates each shingle, thus increasing the otherwise minimal space between each sequentially received shingle. Shinges leave approximate the right end of accelerating conveyor 10 where they are received at a second position by second means 20 which in the preferred embodiment comprises a star wheel catcher. It should be noted that in their path from the conveyor 10 to the star wheel catcher 20 at the second position, each shingle will pass between electric eye 16 and reflector 18 thus breaking the beam of light passing therebetween. As will be set forth in further detail, electric eye 16 generates electrical signals in response to the passage of the front edge and back edge of each shingle S to begin the inverting and stacking sequence.

Directly below star wheel catcher 20 is a third means which receives the shingles after they are dropped vertically from the star wheel catcher 20. This third means 30 comprises stack collection hopper of a construction basically similar to star wheel catcher 20. Also located at this third position are means for forming a stack of shingles comprising air cylinder operated squaring plates 33. Below means 30 is shown a final conveyor 50 at a fourth position. Conveyor 50 receives stacks of the shingles S after formation of these stacks at the third position by the operation of means 30.

Positioned vertically between means 20 and means 30 is a fourth means 40 which comprises preferably a flipper arm which can be selectively positioned in the path of the shingles S as they fall from the second position (by operation of means 20) to the third position and means 30.

Turning to FIG. 2 which shows in an end view more detail of means 20, 30 and 40. Star wheel catcher 20 includes star wheels 21 and 22, which are essentially identical, mirror images of one another and include preferably four radially extending plates 24. One of such plates 24 on each star wheel supports a portion of shingle S when such shingle S is received in the second position after being discharged from conveyor 10. Shingle S will remain supported by these two plates until the star wheels 21 and 24 are caused to rotate by respective electrical motors 23 and 23 shown in phantom. As shown in this figure, star wheel 22 rotates clockwise and star wheel 21 rotates counterclockwise in order to remove the support of the respective plates 24 and 24 from shingle S. Upon such rotation, shingle S falls towards the third location where it is in turn received by stack collection hopper 30.

Stack collection hopper 30 comprises a similar pair of star wheels 31 and 32, each of these star wheel include four radial plates 34, a pair of which (e.g., one plate 34 on each star wheel 31 and 32) is capable of supporting one or a plurality of shingles S when dropped from means 20. Star wheels 31 and 32 rotate to drop the stack of shingles formed therein to conveyor 50 and bring the next pair of plates 34 into supporting position to receive the next shingle to fall from means 20. The weight of the stack of shingles accumulated thereon has been found adequate to cause this rotation once a latching mechanism of known design releases the star wheels 31 and 32.

Unlike plates 21, plates 34 are not continuous. On the contrary, they have gaps (FIG. 1) to accomodate a pair of fixed plates 35 (in the case of star wheel 32) and air cylinder operated edge squaring plates 36 (in the case of star wheel 31). Plates 36 function to align the longitudinal edges against plates 35 of the plurality of shingles held on horizontally oriented plates 34 to form a neat stack of these shingles and thus facilitate later wrapping and bundling of these shingles after the stack is received on conveyor 50. The end edges of the shingles are also adjusted by the operation of a similar fixed plate and air cylinder operated plate 33 as shown in FIG. 1.

Fourth means 40 preferably comprises a flipper arm which is operated by air cylinder 42 via crank 44 which in turn rotates flipper fingers 46 about axis 48. Flipper fingers 46 are positioned along side the vertical path of shingle S as it would fall from its supported position on plates 24 to its third position on plates 34.

On the operation of air cylinder 42, flipper fingers 46 of flipper arm 40 are rotated about axis 48 counter-clockwise as shown in FIG. 2 to bring the upper surface of flipper fingers 46 into the vertical path of shingle S. Flipper fingers 46 total seven and are ranked along the longitudinal length of plates 24. Flipper fingers 34 extend about 7 inches from axis 48. The upper surface of each of these flipping fingers 46 aproximates the shape of a portion of a circular cylinder having a radius of about 13.5 inches. In the preferred embodiment this upper surface is defined by cylindrically bent plate 47. Plate 47 is held in this bent position by properly shaped vertically oriented gusset 48.

Thus defined, the apparatus according to Applicants' invention can be operated to form a stack of shingles. This stack comprising at least one shingle which falls without being rotated from the second position as defined by the horizontal plates 24 of the first set of star wheels to the third position defined by the horizontally oriented plates 34 of the second set of star wheels, and at least a second shingle which has been caused to fall and rotate and thus be inverted. These alternative shingle paths will now be set forth.

FIG. 3 shows sequential positions of shingle $S_1$ as it is received from conveyor 10 and is dropped into bundle collection hopper 30. As shingle $S_1$ is received by star wheel catcher 20, the leading edge thereof breaks the electric eye path causing electric eye 16 to generate a signal. This signal causes air cylinder to either rotate flipper arm 40 clockwise or counter-clockwise to bring flipper fingers 46 to a vertical or horizontal orientation. In this case flipper arm is rotated clockwise in order to permit shingle $S_1$ to fall directly without being inverted to the third position. As the trailing edge of shingle $S_1$ passes between electric eye 16 and mirror 18 a second signal is generated. Star wheel 21 S and 22 are rotated in response to this second signal to release shingle $S_1$ and permit it to fall. Flipper fingers 46, positioned out of the path of shingle $S_1$ and, this position is maintained as shingle $S_1$ passes through interim positions I and II and comes to rest at its resting position on plates 34.

FIG. 4 shows another shingle $S_2$ and its sequential positions similar to those of shingle $S_1$ in FIG. 3. As in FIG. 3, shingle $S_2$ is received on plates 24 and 24 of star wheel catcher 20. Electric eye 16 signals the passage of the leading edge shingle $S_1$ which begins the following operation. In this case electric eye 16 signals air cylinder 42 (FIG. 2) to rotate flipper fingers 46 of flipper arm 40 counter-clockwise into the horizontal position vertically below the normal falling path of shingle $S_2$. Thus positioned, the upper surface 47 thereof is in proper orientation to apply a rotational moment to shingle $S_2$ as it falls. The trailing edge of shingle $S_2$ passes between 16 and 18 causing a second signal to be generated. As with shingle $S_1$, star wheels 21 and 22 are rotated in response to this second signal. Shingle $S_2$ falls by gravity through distance X to interim position I. At interim position I, shingle $S_2$ is engaged by flipper fingers 46. In particular, shingle $S_2$ is engaged approximate one edge by the uppermost portion of the upper surface 47 of fingers 46. This edge is preferably the thick-butt edge and thus would be parallel to the longitudinal axis about which shingle $S_2$ will rotate. Thus engaged, the rotational moment is applied to shingle $S_2$, as it continues to fall. Shingle $S_2$ begins to rotate as it falls.

The upper surface 47 of flipper fingers 46 as has been set forth is shaped approximate that of a portion of a horizontally oriented cylindrical cylinder. This is done to permit the upper surface to continue to engage portions of the shingle as it falls and thus continue to apply the rotational moment about the horizontal axis thereof at substantially all times between interim position I and interim position II. More particularly, due to their shape and positioning, surfaces 47, engage shingle $S_2$ progressively at points closer and closer to the rotational axis of the shingle and consequently farther and farther away from the longitudinal edge which was first impacted or engaged. The benefits of this particular operation will be set forth in further detail below.

In interim position III, shingle $S_2$ has ceased to engage the upper surfaces 47 of flipper fingers 46. However, the rotational moment imparted by the just previous engagement with fingers 46 is of a duration and magnitude such that shingle $S_2$ will rotate as it falls through distance Y and, by the time it reaches its resting position on shingle $S_1$ at plates 34, will have completely inverted, placing the laminated double thick butt edge on the opposite side of the stack. Thus, a stack of two shingles $S_1$ and $S_2$ is formed having their respective thick edge portions on opposite sides of the stack. Continuing this operation with alternate shingles, together with the operation of air cylinder operated plate 36 to align the edges of the shingles in such stack, a neat stack of shingles is formed. This stack can be very easily bundled and packaged in a subsequent operation.

The preferred shape and position of flipper fingers 46 has facilitated the rapid inverting function of Applicants' disclosed apparatus and permits Applicants' apparatus to receive, invert, and form stacks of shingles at an extremely rapid sequential rate. This is possible because the rotation of alternate shingles by flipper fingers 46 is accomplished as the shingle falls through distance Y.

As stated, the curved cylindrical shape of the upper surface 47 of flipper fingers 46 engages the shingles initially at an extreme edge location. This extreme edge location provides the maximum moment arm about the longitudinal axis of the shingle through which to initiate the application of the moment. Put another way, it permits the rapid deceleration of one edge of the rectalinearly falling shingle, which translates as a moment about the longitudinal center of mass. Continued application of the force at this extreme location, however, would not be productive since the distance between the first star wheel catcher and the bundle collection hopper does not permit enough space for the shingle to be fully inverted by merely applying a stopping force at the extreme edge position. On the contrary, Applicants' invention actually reverses the direction of velocity of the thus engaged edge portion by continuing to apply a retarding force at locations progressively closer to the longitudinal center of mass of the shingle. While the center of mass continues to fall, the retarding moment continues to be applied, thus reducing the distance through which the overall shingle must fall in order to completely invert, as graphically shown in FIG. 4.

It should be noted that electric eye 16 functions not only to initiate the sequence of operations of first star wheel 20, bundle collection hopper 30 and flipper arm 40, it also functions to count the number of shingles passing through such a sequence and thus determines the number of such shingles forming each stack of shingles at the bundle collection hopper 30. In Applicants' preferred embodiment, 17 shingles measuring approximately 14 inches by 36 inches are collected by stack collection hopper 30 before the star wheels 31 and 32 are rotated to deposit the 17 shingle stack on final conveyor belt 50. This should be contrasted with other prior art systems which are generally capable of forming only pairs of shingles, absent some further operation, Such prior art systems are thus limited to forming bundles of even numbers of shingles which, depending on the style of shingle stacked, could be a severe limitation.

We claim:

1. An apparatus for forming a stack of shingles, said apparatus comprising:
   (a) a first means for conveying a shingle from a first position to a second position,
   (b) a second means at said second position for receiving said shingle from said first means and for dropping said shingle to a third position,
   (c) third means at said third position for receiving said shingle dropped from said second means and for accumulating a plurality of said shingles sequentially dropped by said second means,
   (d) fourth means positioned vertically between said second means and said third means for selectively applying, to said shingle as it falls from said second means to said third means, a moment about a longitudinal axis of said shingle, said moment being of a magnitude and duration adequate to rotate said shingle about said axis and invert said shingle as it falls to said third position,
   such that said plurality of shingles accumulated by said third means comprises at least one shingle which has been dropped from said second means without being inverted, and at least one shingle which has been dropped from said second means and inverted by said fourth means;
   wherein said fourth means comprises flipper arm configured to initially engage said selected shingle adjacent one edge thereof, said flipper arm being further configured so as to engage said selected shingle at locations progressively closer to said longitudinal axis as said shingle begins to rotate and fall to said third position.

2. An apparatus as set forth in claim 1 wherein said third means includes means for aligning the edges of said plurality of shingles received from said second means to form a stack thereof, said third means comprising means for dropping said stack thus formed to a fourth position.

3. An apparatus as set forth in claim 1 wherein said second means comprises a pair of star wheels, said third means comprises a pair of star wheels.

4. An apparatus as set forth in claim 1 wherein said flipper arm includes a surface configured to be selectively positioned in the path of said selected shingle as it falls from said second means to said third means, the shape of said surface approximating that of a portion of a circular cylinder, the uppermost portion of said surface engaging said selected shingle adjacent said one edge.

5. An apparatus as set forth in claim 4 wherein said flipper arm comprises a plurality of flipper fingers, each said fingers having said shaped surface.

* * * * *